(12) United States Patent
Armstrong et al.

(10) Patent No.: US 8,655,419 B2
(45) Date of Patent: Feb. 18, 2014

(54) PROVIDING A POWER STATE ALTER SIGNAL TO A DEVICE BASED UPON A POSITION SIGNAL CORRESPONDING TO THE MOBILE DEVICE

(75) Inventors: Trevor Armstrong, Bellevue, WA (US); Harish S. Kulkarni, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 881 days.

(21) Appl. No.: 11/701,224

(22) Filed: Feb. 1, 2007

(65) Prior Publication Data
US 2008/0188187 A1 Aug. 7, 2008

(51) Int. Cl.
*H04B 1/38* (2006.01)
*H04W 24/00* (2009.01)

(52) U.S. Cl.
USPC ........................................ 455/572; 455/456.1

(58) Field of Classification Search
USPC ............. 455/456.1, 456.2, 456.3, 457, 404.2, 455/572, 574
See application file for complete search history.

(56) References Cited

U.S. PATENT DOCUMENTS

| | | | |
|---|---|---|---|
| 6,002,918 A | 12/1999 | Heiman et al. | |
| 6,078,826 A * | 6/2000 | Croft et al. | 455/574 |
| 6,166,688 A | 12/2000 | Cromer et al. | |
| 6,681,107 B2 | 1/2004 | Jenkins et al. | |
| 6,693,585 B1 | 2/2004 | MacLeod | |
| 6,954,147 B1 | 10/2005 | Cromer et al. | |
| 6,961,594 B2 | 11/2005 | Rankin | |
| 6,963,744 B2 | 11/2005 | Lin | |
| 6,975,941 B1 * | 12/2005 | Lau et al. | 701/213 |
| 7,139,571 B1 | 11/2006 | Ishikawa et al. | |
| 7,155,199 B2 * | 12/2006 | Zalewski et al. | 455/403 |
| 7,302,264 B2 * | 11/2007 | Yoon et al. | 455/436 |
| 7,865,195 B2 * | 1/2011 | Uemura et al. | 455/456.6 |
| 8,077,837 B1 * | 12/2011 | Wright et al. | 379/88.12 |
| 2003/0134657 A1 | 7/2003 | Norta et al. | |
| 2005/0171695 A1 | 8/2005 | Sullivan et al. | |
| 2005/0246098 A1 | 11/2005 | Bergstrom et al. | |
| 2006/0128384 A1 | 6/2006 | Jagadeesan et al. | |
| 2006/0244825 A1 | 11/2006 | Wang et al. | |
| 2008/0020781 A1 | 1/2008 | Cho | |

FOREIGN PATENT DOCUMENTS

JP 2006139445 A1 6/2006

OTHER PUBLICATIONS

International Search Report cited in related application No. PCT/US2008/051558 dated May 21, 2008.
Zhu; et al., "A Power-Aware and QoS-Aware Service Model on Wireless Networks", Retrieved—Dec. 7, 2006 http://faculty.eng.fiu.edu/~zhuha/infocom04a.pdf.
Huang; et al., "An Energy Conserved on Demand Data Broadcasting System", 2005, http://delivery.acm.org/10.1145/1080000/1071282/p234-huang.pdf?key1=1071282&key2=9690745611&coll=GUIDE&dl=GUIDE&CFID=6303785&CFTOKEN=66371979.

(Continued)

*Primary Examiner* — Eugene Yun
(74) *Attorney, Agent, or Firm* — Andrew Sanders; Micky Minhas (57) ABSTRACT

A system and method for providing a power state alter signal to a device based upon a position signal corresponding to the mobile device is disclosed. The technology initially accesses a position based rule. The position based rule is then compared to a position signal. A power alerting signal is provided when the position based rule correlates with the position signal.

20 Claims, 5 Drawing Sheets

(56) References Cited

OTHER PUBLICATIONS

Kravets; et al., "Power management techniques for mobile communication", 1998, http://delivery.acm.org/10.1145/290000/288276/p157-kravets.pdf?key1=288276&key2=3019645611&coll=GUIDE&dl=GUIDE,GUIDE&CFID=11111111&CFTOKEN=2222222.

Kozuch; et al. "Internet Suspend/Resume", Apr. 2002, http://www.intel-research.net/Publications/Pittsburgh/110620030912_88.pdf.

Preliminary Report on Patentability cited in related PCT Application No. PCT/US2008/051558 dated Aug. 13, 2009.

Chinese Office Action cited in related Chinese Application No. 200880003914.6 dated Sep. 7, 2010.

Chinese Office Action cited in related Chinese Application No. 200880003914.6 dated Jun. 2, 2010.

Chinese Office Action cited in Chinese Application No. 200880003914.6 dated Mar. 23, 2012, 6 pgs.

Reply first Chinese Office Action cited in Chinese Application No. 200880003914.6 dated Jan. 18, 2011, 14 pgs.

Reply second Chinese Office Action cited in Chinese Application No. 200880003914.6 dated Aug. 15, 2011, 17 pgs.

Reply third Chinese Office Action cited in Chinese Application No. 200880003914.6 dated May 23, 2012, 12 pgs.

Fourth Chinese Office Action cited in Chinese Application No. 200880003914.6 dated Oct. 22, 2012, 10 pgs.

Reply fourth Chinese Office Action cited in Chinese Application No. 200880003914.6 dated Dec. 24, 2012, 14 pgs.

Fifth Chinese Office Action cited in Chinese Application No. 200880003914.6 dated Apr. 23, 2013, 6 pgs.

Reply fifth Chinese Office Action cited in Chinese Application No. 200880003914.6 dated Jun. 21, 2013, 10 pgs.

Chinese Notice of Allowance cited in Chinese Application No. 200880003914.6 dated Oct. 22, 2013, 6 pgs.

* cited by examiner

PROVIDING A POWER STATE ALTER SIGNAL TO A DEVICE BASED UPON A POSITION SIGNAL CORRESPONDING TO THE MOBILE DEVICE

BACKGROUND

Presently, computer systems are used throughout daily life for both work and entertainment. Computer systems are available in many different forms, ranging from the stationary desktop computer to mobile devices such as laptop computers and personal digital assistants (PDAs). These mobile devices come in all shapes and sizes, and are generally powered by batteries. Moreover, advances in battery technology have permitted battery powered mobile devices to be used for significant periods of time before recharging becomes necessary.

However, there exist many limitations to the current state of technology with respect to battery run mobile devices. For example, as mobile devices shrink in form factor but increase in functionality, more of a strain is being placed on the mobile device's batteries. Even a fully charged battery has a finite life, and there exist limited choices when it comes to conserving a mobile device's battery run-time capacity. Primarily, a mobile device must be shut down when not in use in order to preserve the battery's remaining life, and then powered up again when needed.

While turning the mobile device off and on again conserves the battery's life, this conservation method is prone to user error. For example, a businessman traveling across town for an important business meeting, either turns his mobile device on too soon before the meeting or forgets to turn his laptop computer off before leaving the office. This user error creates battery life waste.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for providing a power state alter signal to a device based upon a position signal corresponding to the mobile device is disclosed. The technology initially accesses a position based rule. The position based rule is then compared to a position signal. A power alerting signal is provided when the position based rule correlates with the position signal.

Embodiments of the present technology enable a computer system to remain in a low power suspended state until its functions are needed, thereby conserving the battery's remaining life. Additionally, one embodiment enables a computer system employing a position monitoring device to conserve energy while performing navigation functions. Also, the present technology enables safe access to computer functions while the user is in transit, while also providing a system or method to conserve battery life. Hence, alternative embodiments of the present technology permit the user to conserve a mobile device's battery run-time capacity.

DESCRIPTION OF THE DRAWINGS

The accompanying drawings, which are incorporated in and form a part of this specification, illustrate embodiments of the technology for providing a power state alter signal to a device based upon a position signal corresponding to the mobile device and, together with the description, serve to explain the principles discussed below.

The drawings referred to in this description should be understood as not being drawn to scale except if specifically noted.

DETAILED DESCRIPTION

Reference will now be made in detail to embodiments of the present technology for providing a power state alter signal to a device based upon a position signal corresponding to the mobile device, examples of which are illustrated in the accompanying drawings. While the technology for providing a power state alter signal to a device based upon a position signal corresponding to the mobile device will be described in conjunction with various embodiments, it will be understood that they are not intended to limit the present technology for providing a power state alter signal based upon a position signal corresponding to the mobile device to these embodiments. On the contrary, the present technology for providing a power state alter signal to a device based upon a position signal corresponding to the mobile device is intended to cover alternatives, modifications and equivalents, which may be included within the spirit and scope the various embodiments as defined by the appended claims.

Furthermore, in the following detailed description, numerous specific details are set forth in order to provide a thorough understanding of the present technology for providing a power state alter signal to a device based upon a position signal corresponding to the mobile device. However, the present technology for providing a power state alter signal to a device based upon a position signal corresponding to the mobile device may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "receiving", "performing", "generating", "displaying", "selecting", "scrolling", "highlighting", "presenting", "testing", "identifying", "reporting", "prompting", "suppressing", "providing", and "refreshing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for providing a power state alter signal to a device based upon a position signal corresponding to the mobile device is also well suited to the use of other computer systems such as, for example, optical and mechanical computers.

Example Computer System Environment

Figure 1:
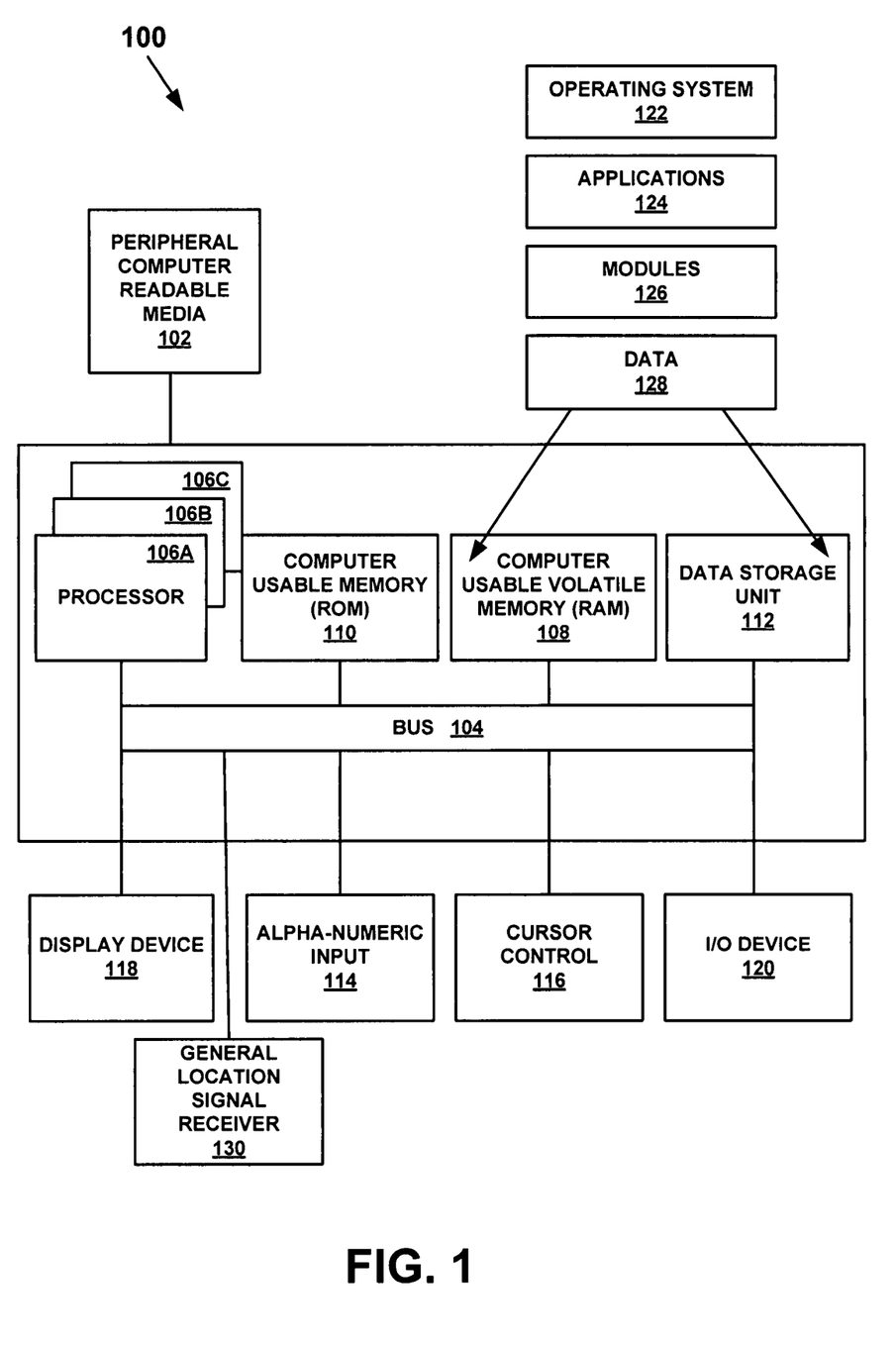
FIG. 1 is a diagram of an example computer system used in accordance with embodiments of the present technology for providing a power state alter signal to a device based upon a position signal corresponding to the mobile device.

With reference now to FIG. 1, portions of the technology for providing a power state alter signal to a device based upon a position signal corresponding to the mobile device are composed of computer-readable and computer-executable instructions that reside, for example, in computer-usable media of a computer system. That is, FIG. 1 illustrates one example of a type of computer that can be used to implement embodiments, which are discussed below, of the present technology for providing a power state alter signal to a device based upon a position signal corresponding to the mobile device.

FIG. 1 illustrates an exemplary computer system 100 used in accordance with embodiments of the present technology for providing a power state alter signal to a device based upon a position signal corresponding to the mobile device. It is appreciated that system 100 of FIG. 1 is exemplary only and that the present technology for providing a power state alter signal to a device based upon a position signal corresponding to the mobile device can operate on or within a number of different computer systems including general purpose networked computer systems, embedded computer systems, routers, switches, server devices, consumer devices, various intermediate devices/artifacts, stand alone computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C.

System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. I may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands.

System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet. A more detailed discussion of the present technology for providing a power state alter signal to a device based upon a position signal corresponding to the mobile device is found below.

Referring still to FIG. 1, various other components are depicted for system 1 00. Specifically, when present, an operating system 122, applications 124, modules 126, and data 128 are shown as typically residing in one or some combination of computer usable volatile memory 108, e.g. random access memory (RAM), and data storage unit 112. However, it is appreciated that in some embodiments, operating system 122 may be stored in other locations such as on a network or on a flash drive; and that further, operating system 122 may be accessed from a remote location via, for example, a coupling to the internet. In one embodiment, the present technology for providing a power state alter signal to a device based upon a position signal corresponding to the mobile device, for example, is stored as an application 124 or module 126 in memory locations within RAM 108 and memory areas within data storage unit 112.

System 100 also includes a general location signal receiver, coupled to bus 104. In one embodiment, the general location signal receiver is a global navigation satellite system (GNSS) receiver which may receive signals from a group of signal providers comprising: Galileo, Global Positioning System (GPS), Wide Area Augmentation Service (WAAS), Egnos, and Compass. Additionally, the general location signal receiver may also access signals through, but not limited to, the following: wireless fidelity (Wi-Fi), pings, and wireless access points (WAP or AP). The general location signal receiver may be coupled to computing system 100 in a number of ways, including wired or wirelessly. In addition, but not limited to, the general location signal receiver may be positioned internally or externally and may be either permanent or temporary.

Additionally, it is appreciated that a location sensing peripheral can be completely independent of any satellite based navigation system. For example, in one embodiment of the present technology, it is possible to construct a location infrastructure purely from Wi-Fi and not just with a GNSS receiver receiving signals from Wi-Fi (which is an Advance Global Positioning System [AGPS]). For example, it is possible to construct a location providing infrastructure from a network of motion sensors, Radio Frequency Identification Devices (RFIDs), Independent Radio (IR) receivers, etc.

The computing system 100 is only one example of a suitable computing environment and is not intended to suggest any limitation as to the scope of use or functionality of the present technology. Neither should the computing environment 100 be interpreted as having any dependency or requirement relating to any one or combination of components illustrated in the exemplary computing system 100.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Overview

As an overview, in one embodiment, the present technology provides a method and system for providing a power state alter signal to a device based upon a position signal corresponding to the mobile device, so that a mobile device may change its power state in response to the power state alter signal. For example, a component of a mobile device system may send a position based rule to the general location signal receiver which itself may also be a component coupled with the mobile device. The general location signal receiver, which is monitoring position signals sent from a general location signal provider, will compare the position based rule with the position signal. When the position based rule and the position signal correlate, the general location signal receiver will send a power state alter signal to at least one component of the mobile device. After receiving this power state alter signal, any or all of the components within the mobile device then may alter power states. For example, the mobile device may switch from a low power suspended state to a fully powered state, or vice-versa. Additionally, after switching from the low power suspended state to the fully powered state, the mobile device may also provide a message, such as audio, visual, tactile, or the like, to the user.

In another embodiment, a module is communicatively coupled to a general location signal receiver, and to any number of such devices as a Wi-Fi card, an RFID reader, or the like. Position based rules are then sent to the module, which module can then send power state alter signals to a range of equipment. The module is capable of receiving a position based rule, comparing the position based rule with the position signal garnered from the general location signal receiver, and generating a power state alter signal. Thus, current commodity hardware may be used, rather than creating new general location signal receivers capable of accepting position based rules and generating power state alter signals.

In general, the position based rule may be defined based on information relating to location, velocity, time, signal type, broadcast IP addresses, signal strength, type of broadcast received and the like. In addition, each of these values can be specified as a range and/or as a combination of more than one type of variable. In one embodiment, the correlation between the position based rule and the position signal refers to a point during the comparison when the position based rule and the position signal are similar, are a match, are within a certain accuracy of one another, or the like. For example, when a mobile device provides a position based rule, the current position is compared with the position based rule.

Furthermore, an accuracy metric may also be utilized when performing the comparison. In other words, the accuracy of the correlation between the position based rule and the position signal may be established by the mobile device, may be defined by a user, may be based on the accuracy of the device receiving the position information, or the like. For example, the correlation between the position based rule and the position signal may be a default correlation such as ±5 percent, 10 percent, or the like.

For example, a user is using a laptop computer to navigate from one city to another. The user has instructed the laptop computer to resume operations within five miles of the exit for the targeted destination. The laptop computer will provide the position based rule, i.e., "within five miles of the exit", to the position signal monitoring component. The laptop computer then switches itself to a low power suspended state. When the laptop computer comes within five miles of the exit, the position signal monitoring component recognizes the correlation between the position based rule and the position signal and provides a power state alter signal. At least one component of the laptop computer receives the power state alter signal and automatically returns to a higher power state. In another embodiment, after returning to the higher power state, the laptop computer will also provide to the user an audio and/or visual message as to the exit's proximity. Thus, by suspending itself when not needed, the laptop computer has conserved energy that would have normally been wasted.

In one embodiment, a general location signal receiver accessed a position based rule from a laptop computer. This position based rule instructed the general location signal receiver to communicate a power state alter signal to the laptop computer when the position based rule of "within five miles" of the exit correlates to the general location signal provider's position signal of coordinates corresponding to within five miles of the exit. After sending the position based rule to the general location signal receiver, the laptop computer switched itself to a low power suspended state while waiting for the power state alter signal. When the position based rule matched the general location signal provider's position signal, then the general location signal receiver sent a power state alter signal to the laptop computer. Subsequently, and in response to the power state alter signal, the laptop computer switched itself to a higher power state. In another embodiment, the laptop computer also audibly and visibly informed the user of the exit's proximity.

Position based rules may also include a combination of position, velocity, and time factors. For an example of an embodiment incorporating the time factor, a suspended laptop may wake itself if it is at work near five p.m., in an attempt to automatically sync the user's files and/or mail before heading home for the day. Moreover, the position based rules may include location based reminders, calendar reminders, and navigation reminders. For example, a general location signal receiver having been programmed to monitor a mobile device's calendar, may cause the user to be alerted to pick up dry cleaning when the user travels within a half mile of the dry cleaning store. The mobile device, having been in a low power suspended state, was able to resume operation and provide the alert in response to the general position signal receiver's power state alter signal. Moreover, in one embodiment, after providing the alert, the mobile device may then revert back to the low power suspended state. Thus, the automatic accessing of the user's schedule by the general location signal receiver serves to conserve battery power by powering up the mobile device to alert to relevant tasks based upon location. Automatic accessing also serves to safely provide messages to the user while the user is in transit. In one embodiment, the alert may be audibly displayed, visibly displayed, or the like.

Architecture

Figure 2:
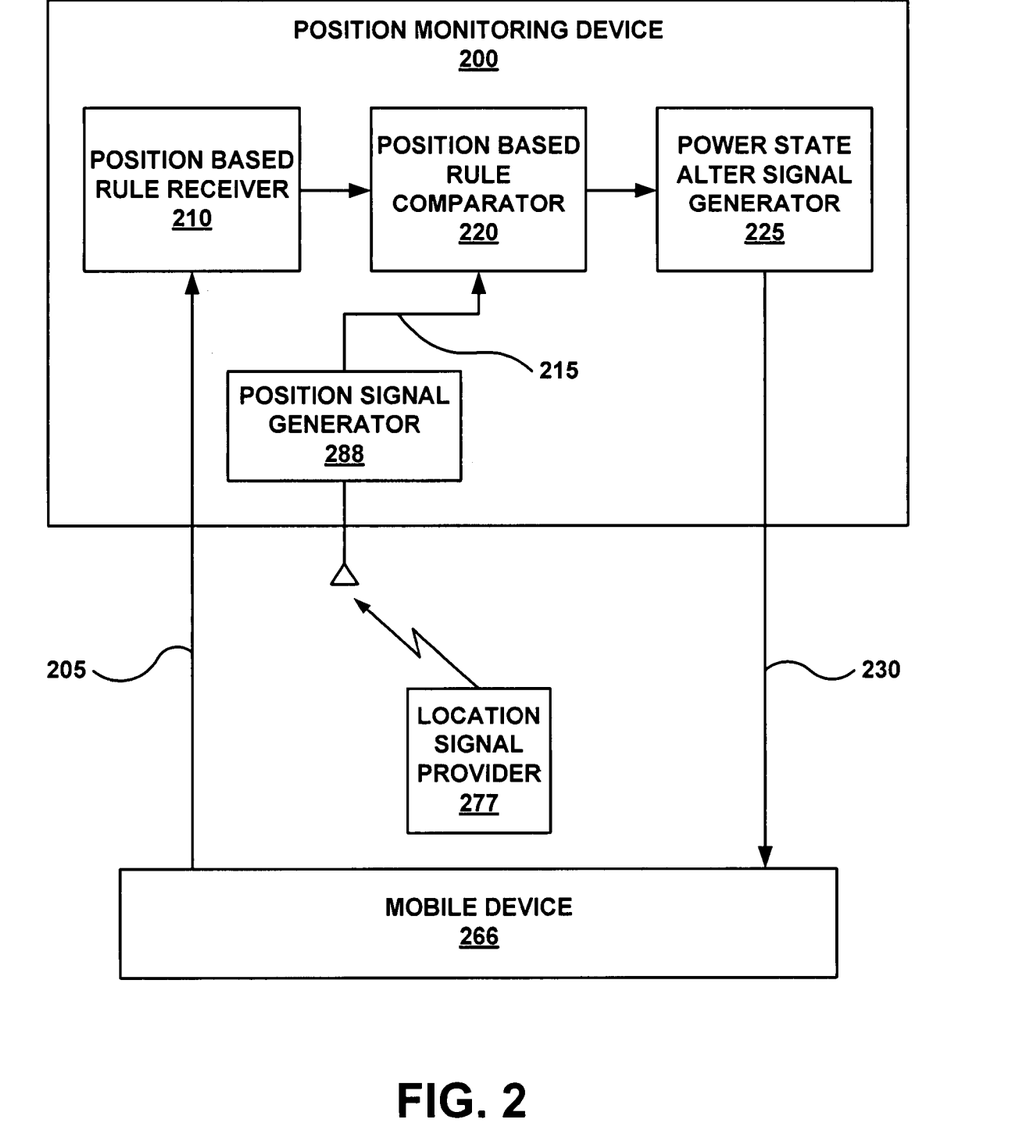
FIG. 2 is a block diagram of an example position monitoring device in accordance with one embodiment of the present technology.

With reference now to FIG. 2, a block diagram of an exemplary position monitoring device 200 is shown in accordance with one embodiment of the present technology. In general, position monitoring device 200 includes a position based rule receiver 210, a position signal generator 288, a position based rule comparator 220, and a power state alter signal generator 225.

Additionally, line 205 represents the pathway of a position based rule being sent from the mobile device 266 to the position based rule receiver 210. Line 215 represents the pathway of a position signal being sent from the position signal generator 288 to the position based rule comparator 220. Line 230 represents the pathway of a power state alter signal being sent from the power state alter signal generator 225 to the mobile device 266. Furthermore, pathways 205, 215, and 230 may connect various components in a number of ways, including wired or wirelessly.

In one embodiment, the position signal generator 288 receives the position signal sent from the location signal provider 277 along the pathway 215, in the form of raw data, such as numbers or addresses. The position signal generator 288 converts this raw data into a position signal recognizable by the position based rule comparator 220. The position signal generator 288 may be a general location signal receiver 130 itself, or may be coupled to a general location signal receiver 130. Additionally, the general location signal receiver 130 may be positioned internally or externally to the position monitoring device 200, while being communicatively coupled to the position monitoring device 200 or components or modules therein.

Furthermore, in one embodiment, position monitoring device 200 has the position signal generator 288 positioned internally to the position based rule comparator 220. In another embodiment, the position signal generator 288 is positioned internally to the position monitoring device 200, and communicatively coupled but external to the position based rule comparator 220. In yet another embodiment, the position signal generator 288 is located externally to the position monitoring device 200, while being communicatively coupled to the position based rule comparator 220.

In one embodiment, the operation of position monitoring device 200 utilizes a position monitoring device's physical location as a mechanism for when to provide a signal to a mobile device to change its power state. For example, a position based rule travels along pathway 205 and is received as an input to position based rule receiver 210. Position based rule receiver 210 then communicates position based rule to position based rule comparator 220. In one embodiment, position based rule receiver 210 may receive only one position based rule. However, in another embodiment, position based rule receiver 210 may receive any number of position based rules.

In another embodiment, position based rule receiver 210 may access user information, such as calendar information, user preferences and the like, and may form a plurality of position based rules based on the user information. In yet another embodiment, position based rule receiver 210 may receive any or all of the position based rules such as those received and those accessed. Moreover, as described in detail herein, the position based rule receiver 210 may receive one or more position based rules from a first device that includes a direction to provide the power state alter signal along pathway 230 to a second device.

Position based rule comparator 220 compares the position based rule with a position signal sent along pathway 215 and received from a location signal provider 277, such as Galileo, GPS, WAAS, Egnos, Compass, or the like. Position based rule comparator 220 is configured to receive a position signal along pathway 215 such that the position signal is a conversion of the raw data sent from the location signal provider 277. In one embodiment, the conversion of raw data is done through the position signal generator 288. For example, in one embodiment the position based rule comparator 220 will monitor the correlation between the position based rule and the received position signal until the position based rule and the position signal are similar, are a match, are within a certain accuracy of one another, or the like.

In other embodiments of the present technology, one or more position monitoring devices 200 are communicatively coupled to mobile device 266 and positioned internally to mobile device 266. In yet other embodiments, one or more position monitoring devices 200 are communicatively coupled to mobile device 266 and positioned externally to mobile device 266.

Furthermore, the comparator may also utilize an accuracy metric when performing the comparison. In other words, the accuracy of the correlation between the position based rule and the position signal may be established by the mobile device, may be defined by a user, may be based on the accuracy of the device receiving the position information, or the like.

When the position based rule correlates with the position signal the position based rule comparator 220 alerts the power state alter signal generator 225. The power state alter signal generator 225 then sends a power state alter signal along pathway 230 to one or more components of computing system 100. For example, the power state alter signal may be received by, but is not limited to, a hard drive, a processor, a data storage unit or the like.

In one embodiment, the position monitoring device 200 is a GNSS receiver receiving signals from a group of GNSS signal providers comprising: Galileo, GPS, Glonass, WAAS, Egnos, and Compass. In another embodiment, the position monitoring device 200 is a modem, a Wi-Fi detector, a Bluetooth device, a wireless receiver, and the like. In another embodiment, the position monitoring device 200 may pick up signals through another means, including but not limited to: Wi-Fi, pings, WAP or AP, beacons, mobile telephone towers, radio beacons, or the like.

In yet another embodiment, the position monitoring device 200 is communicatively coupled to a GNSS receiver receiving signals from a group of GNSS signal providers comprising: Galileo, GPS, Glonass, WAAS, Egnos, and Compass. In another embodiment, the position monitoring device 200 is communicatively coupled to a modem, a Wi-Fi detector, a Bluetooth device, a wireless receiver, and the like. In another embodiment, the position monitoring device 200 may pick up signals through another means, including but not limited to: Wi-Fi, pings, WAP or AP, beacons, mobile telephone towers, radio beacons, or the like.

For example, it is possible to have the position based rule receiver 210, position based rule comparator 220, and position state alter signal generator 225 occur in combination within a module, but communicatively coupled to a separate module containing a general location signal receiver 130. Additionally, another embodiment might have the position based rule receiver 210, position based rule comparator 220, and position state alter signal generator 225 communicatively coupled to each other but existing in separate modules. Furthermore, these separate modules may also be communicatively coupled individually or in combination with each other, to one or more general location signal receivers 130.

Position based rule may include, but is not limited to, preprogrammed instructions, input from the user, information in a user's calendar, Internet based information, user preferences and the like. In one embodiment, position based rule information may consist of a set of location factors such as position, velocity, or time. However position based rule may also combine location conditions with a plethora of different types of information such as scheduling information, navigational factors, user preferences, previous user selections, user favorites and the like. Moreover, position based rule may be automatically provided to, or may be accessed by, position monitoring device 200.

In one embodiment, the position based rule receiver 210 receives a position based rule sent along pathway 205 from a component of computer system 100. This computer system 100 may be a mobile device 266 such as, but not limited to, a laptop computer, a notebook computer, a Personal Digital Assistant (PDA), a mobile phone, a personal music device, a Universal Serial Bus (USB), a self-contained general location signal receiver computing unit, an attached general location signal receiver unit, or the like including mobile computing systems provided in the description of FIG. 1.

Operation

Figure 3:
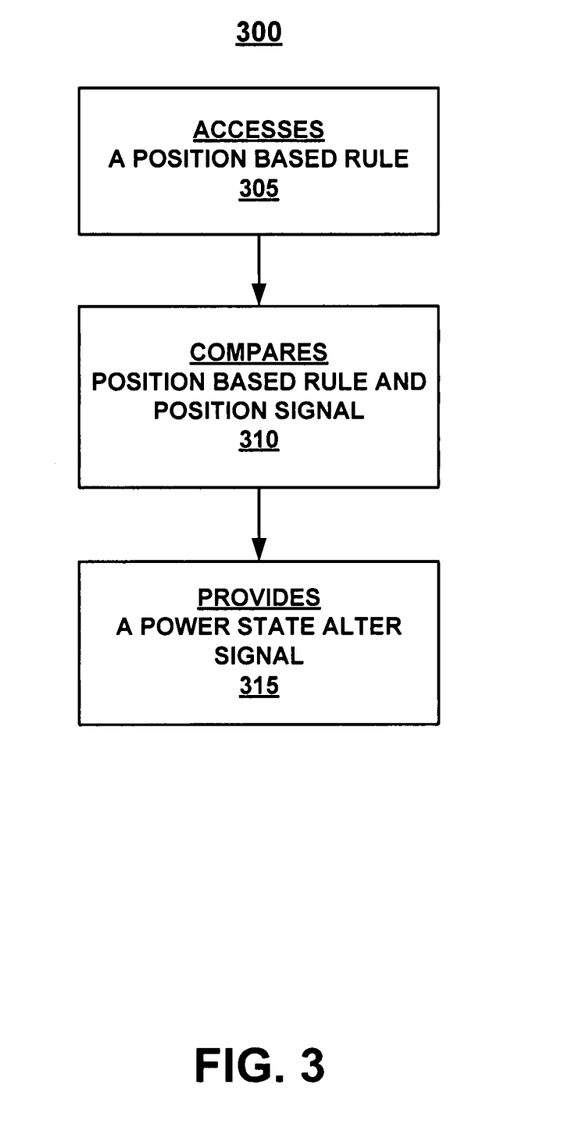
FIG. 3 is a flowchart of an example method of providing a power state alter signal to a device based upon a position signal corresponding to the mobile device in accordance with one embodiment of the present technology.

With reference now to FIG. 3, a flowchart 300 of an example method of providing a power state alter signal along pathway 230 to a device based upon a position signal sent along pathway 215 corresponding to the mobile device is shown in accordance with one embodiment of the present technology.

Referring now to 305 of FIG. 3 and to FIG. 2, one embodiment accesses a position based rule. As described herein, in another embodiment of the present technology, the position based rule sent along pathway 205 is received by the position based rule receiver 210. In general, the position based rule may be any type of rule wherein when the rule is true, a power state alter signal sent along pathway 230 is desired by the mobile device. For example, the position based rule may define a specific geographic location, a specific beacon, a ping from another computing device, reception of a certain radio signal, or the like.

Referring now to 310 of FIG. 3 and to FIG. 2, one embodiment compares a position based rule sent along pathway 205 with a position signal sent along pathway 215. In one embodiment, a position signal sent along pathway 215 is provided from a location signal provider 277 to a general location signal receiver such as a GNSS receiver. These location signal providers 277 may be, but are not limited to, the following: Galileo, GPS, WAAS, Egnos, and Compass. In another embodiment, the position signal is provided to position monitoring device 200 such as a modem, a Wi-Fi detector, a Bluetooth device, a wireless receiver, and the like.

The position based rule comparator 220 compares the position based rule with the position signal. When the position based rule correlates with the position signal, the power state alter signal generator 225 generates a power state alter signal along pathway 230. In other words, as stated herein, in one embodiment, position based rule comparator 220 will monitor the correlation between the position based rule and the position signal until the position based rule and the position signal are similar, are a match, are within a certain accuracy of one another, or the like.

Furthermore, the position based rule comparator 220 may also utilize an accuracy metric when performing the comparison. In other words, the accuracy of the correlation between the position based rule and the position signal may be established by the mobile device 266, may be defined by a user, may be based on the accuracy of the device receiving the position information, or the like.

Referring now to 315 of FIG. 3 and FIG. 2, one embodiment provides a power state alter signal along pathway 230 communicated to one or more components of a computer system including, but not limited to, a hard drive, a processor, a data storage unit or any other component coupled with the computer system 100. In one embodiment, the component of computer system 100 receiving the power state alter signal having traveled along pathway 230 may alter its power state. In another embodiment, more than one component of computer system 100 may receive a power state alter signal and alter their power states. In yet another embodiment, the component of computer system 100 receiving the power state alter signal having traveled along pathway 230 may alter one or more other components' power state.

In one embodiment, position monitoring device 200 will access and extract information from the mobile device. For example, position monitoring device 200 may access the calendar, email, notes, tasks or other user's informational data stored on the mobile device. In another embodiment, the position monitoring device 200 may access a second device, such as a mobile phone, in wired or wireless range to establish a position based rule.

Moreover, after receiving the power alter signal having traveled along pathway 230 from the position monitoring device 200, the mobile device 266 may provide the user with an audio message based upon the user's informational data. For example, a PDA's computer system knows that the user has a meeting at a place which is 100 miles away. The user takes the PDA along with him while he drives to the meeting. During the drive, and before the PDA enters a low power suspended state to conserve energy, the position monitoring device 200 would access and extract calendaring information from the PDA. As the user arrives at the meeting site, and based upon the PDA's signal position and extracted calendar information, the position monitoring device 200 will send a power state alter signal along pathway 230 to the PDA. In response to this signal, the PDA will return to a high power state.

For example, position monitoring device 200 may send the power state alter signal along pathway 230 after position based rule comparator 220 declares a correlation based on a position correlation, a WAP that is recognized at the meeting location, a wireless reception of another user's device, such as "the Boss's PDA", or the like.

Moreover, in one embodiment, the PDA will also deliver a preprogrammed audible, visual, vibration, or combination thereof, message to the user. In another embodiment, the PDA may contact and provide the message to another of the user's devices. For example, the PDA may provide a text or voice message to the user's mobile telephone, or may send an email to the user's computer. Additionally, the PDA may provide the message to another device not related to the user, such as the user's boss, significant other, accountant, any or all of the personnel at the meeting, or the like.

In another embodiment, the mobile device will provide a position based rule along pathway 205 such that when the user is near a certain location, the mobile device will receive a power state alter signal from pathway 230 and resume a higher power state. In one embodiment, the resuming of a higher power state will also include an audible, visual and/or tactile message. In one embodiment, after delivering the audible, visual and/or tactile message, the mobile device will switch back to a lower power state. For example, the mobile device may enter a higher power state and provide an alert that the user is within a mile of a targeted driving destination, such as a dry cleaning store, and that the user's dry cleaning is scheduled to be ready for pick-up. After providing the message, the mobile device may remain in a higher power state, switch back to a low power suspended state, or provide another position based rule along pathway 205 to the position monitoring device 200.

Furthermore, once the mobile device is powered up, the mobile device may remain in the current power state to allow for word processing or other functions. For example, a user intends to nap in a chauffeured vehicle while on the way to an important meeting. The user instructs the mobile device to generate an alarm when it is within one mile of the meeting place and to allow the user to perform some operations such as word processing, emailing, Internet accessing and the like. Thus, the mobile device will provide position based rule along pathway 205 to the position monitoring device 200 and switch to a low powered suspended state. When the mobile device is within one mile from the meeting place, and the power state alter signal from along pathway 230 is received, the mobile device will return to a higher powered state and provide the requested alarm. Moreover, the mobile device will remain in the higher powered operational state such that the user to able to perform the desired operations.

In another embodiment, the present technology provides a location and time based instruction capability allowing the user a hands off approach to change the power state of a mobile system. In other words, the position based rule may include both position information and time information. That is, the position monitoring device 200 is instructed to provide the power state alter signal along pathway 230 when it is at a certain location for a certain amount of time. For example, a user habitually visits a coffee shop for thirty minutes or less while on his way to work. Sometimes the user just gets coffee and continues on route to work, while other times the user stays at the coffee shop for a longer period of time. Thus, when the user remains at the coffee shop for a certain period of time, e.g., more than five minutes, the mobile device will receive the power state alter signal from pathway 230 and change to a higher power state thereby allowing the user to utilize the mobile device capabilities without having to manually perform the initial power-up sequence.

Figure 4:
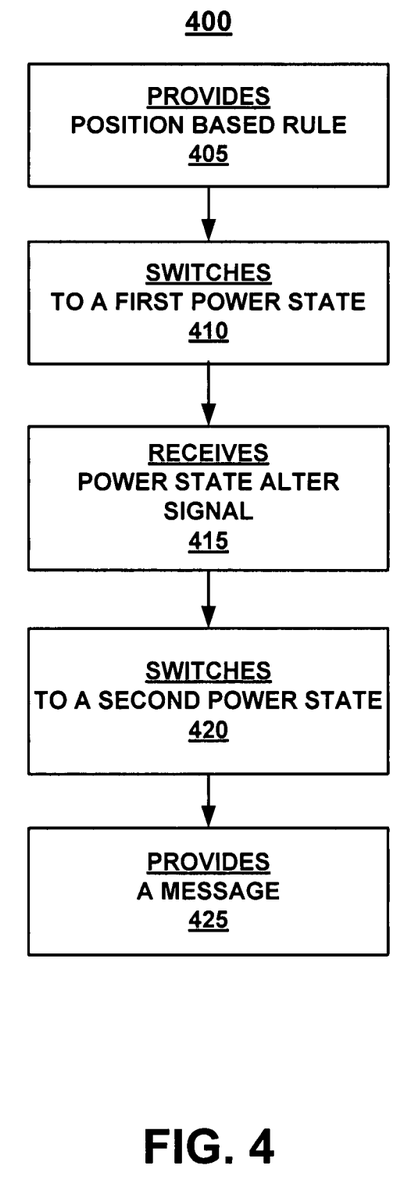
FIG. 4 is a flowchart of an example method of providing a power state alter signal to a device based upon a position signal corresponding to the mobile device in accordance with one embodiment of the present technology.

With reference now to FIG. 4, a flowchart 400 of an example method of providing a power state alter signal traveling along pathway 230 to a device 266 based upon a position signal sent along pathway 215 corresponding to the mobile device 266, is shown in accordance with one embodiment of the present technology.

Referring now to 405 of FIG. 4 and to FIG. 2, one embodiment provides a position based rule sent along pathway 205 from a mobile device 266 to a general location signal receiver 130 device. The position based rule may be based on input by the user, preprogrammed information, user preference information and the like. Moreover, the position based rule may include any, all or a combination of factors including, but not limited to, location, velocity, time, signal type, broadcast IP addresses, signal strength, type of broadcast received and the like.

Referring now to 410 of FIG. 4 and to FIG. 2, in one embodiment the mobile device switches to a first power state after providing a position based rule along pathway 205 to a position based rule receiver 210. The first power state may be any power state such as a lower power but still partially active state, a standby state, a hibernation state, a low power suspended state, or the like. In another embodiment, the first power state may be the same as the original power state. That is, the user's position based rule instructions may have been crafted so as to permit the mobile device to continue running at the same power state as the original power state despite providing the position based rule along pathway 205 to the position based rule receiver 210.

Referring now to 415 of FIG. 4 and to FIG. 2, one embodiment receives a power state alter signal from along pathway 230. In one embodiment, the power state alter signal is received from the power state alter signal generator 225.

Referring now to 420 of FIG. 4 and FIG. 2, one embodiment switches the mobile device to a second power state after the power state alter signal from along pathway 230 is received. In one embodiment, the second power state may be any power state that is different from the first power state. In another embodiment, the mobile device's second power state may be similar to the first power state. For example, the user's position based rule instructions may have been crafted so as to permit the mobile device to continue running at the same power state as the first power state despite receiving a power state alter signal from pathway 230.

Referring now to 425 of FIG. 4, one embodiment provides a message after receiving power state alter signal from along pathway 230. Another embodiment provides an audio message after receiving power state alter signal from along pathway 230. For example, after the mobile device receives power state alter signal from along pathway 230, the mobile device may provide the message, "B., pick up M. and G. from soccer practice." In one embodiment, after the mobile device provides the audio message, it may switch back to the low power suspended state.

Another embodiment provides a video message after receiving power state alter signal from along pathway 230, which may include text or graphics. For example, after the mobile device receives power state alter signal along pathway 230, the mobile device may display the text message, "B., pick up M. and G. from soccer practice.". In one embodiment, after the mobile device provides a video message, it may switch back to a low power suspended state. In yet another embodiment, after the mobile device receives power state alter signal from along pathway 230, the mobile device may provide a tactile message. For example, the tactile message may be a vibration, a Morse code, brail message, or other message based on the sense of touch.

Another embodiment provides an audio message and a video message at the same time, after the mobile device switches to a second power state 420. Another embodiment provides messages such as audio, video, tactile, or any combination thereof, at the same time. For example, after the mobile device receives power state alter signal along pathway 230, the mobile device may display the text message, "B., pick up M. and G. from soccer practice." while also providing a tactile message communicating, "B., pick up M. and G. from soccer practice."

Figure 5:
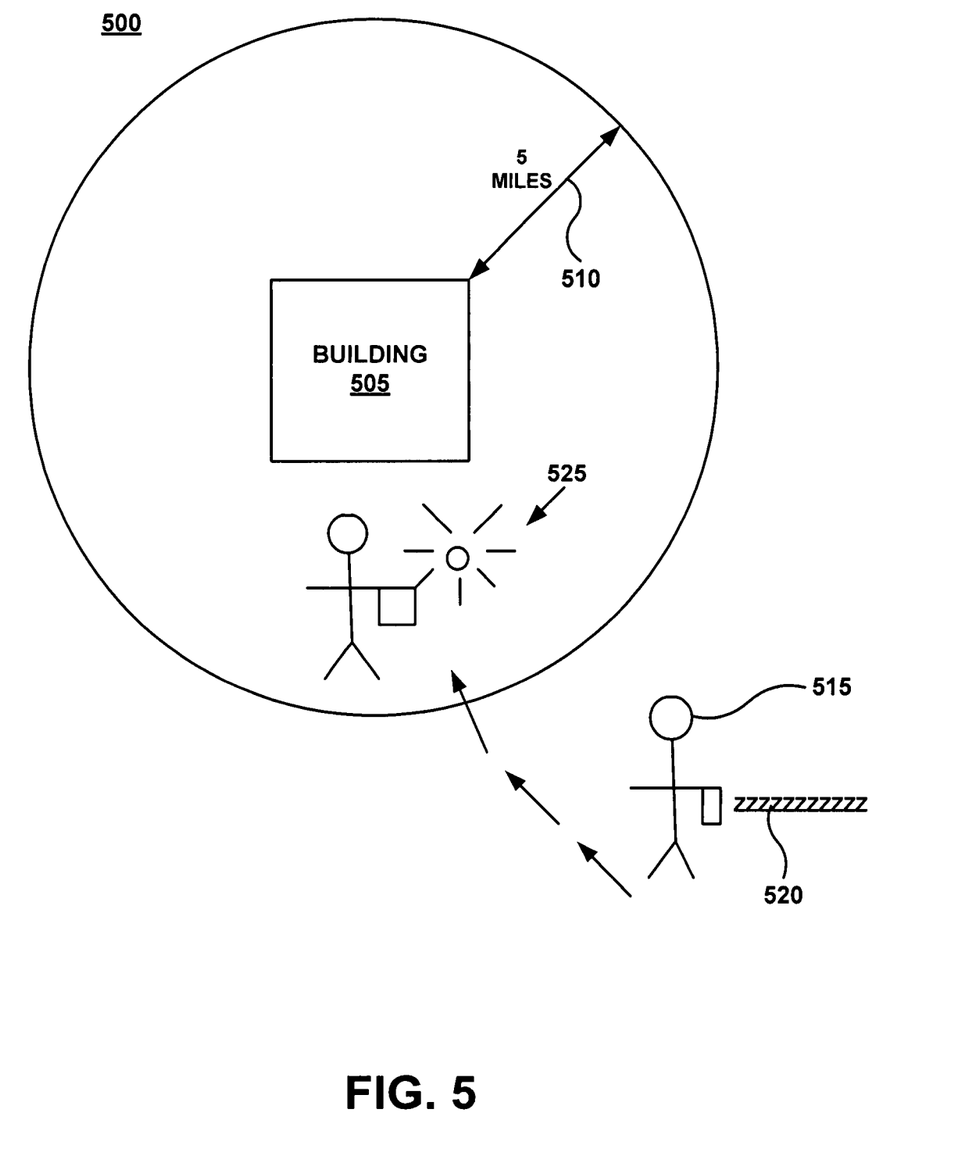
FIG. 5 is a diagram of an example method of providing a power state alter signal to a device based upon a position signal corresponding to the mobile device, in accordance with one embodiment of the present technology.

With reference now to FIG. 5, a diagram 500 of an example power state alter signal being provided to a device based upon a position signal 215 corresponding to the mobile device 266, is shown in accordance with one embodiment of the present technology.

For example, the mobile device may provide a position based rule 205 based on a user's proximity 510 to Building 505. In this instance, the position based rule 205 corresponds to a proximity 510 location of five miles away from Building 505. In the present example, after providing the position based rule along pathway 205, mobile device 520 enters a low power suspended state. In so doing, the mobile device 520 will remain in the low power suspended state until the position based rule sent along pathway 205 correlates with the mobile device's position signal sent along pathway 215.

As described herein, position monitoring device 200 monitors position signal and compares the position based rule with the position signal. When the user passes within proximity 510 of building 505, a power state alter signal sent along pathway 230 is provided to mobile device 520. In one embodiment, the power state alter signal is generated because the position based rule correlates to the position signal being monitored by position monitoring device 200. A component of the mobile device receives the power state alter signal and switches to a higher power state 525 in response. In another embodiment, after mobile device 520 resumes, it provides a message to user 515. The user 515 is thus informed when within five miles of Building 505.

Thus, the present technology provides a method and system for providing a power state alter signal sent along pathway 230 to a device based upon a position signal sent along pathway 215 corresponding to the mobile device 266. Moreover, the present technology enables a computer system to remain in a low power suspended state until its functions are needed, thereby conserving the battery's remaining life. Additionally, the present technology enables a computer system employing a position monitoring device to conserve energy while performing navigation functions. Also, the present technology enables safe access to computer functions while the user is in transit, while also providing a system or method to conserve battery life.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for altering a power state of a device, comprising:
    while the device is operating at a reduced power state:
        generating a position signal indicative of a location of the device;
        comparing the position signal to a power altering rule providing for altering the power state of the device from the reduced power state to an increased power state, different than the reduced power state, when the device is within a specified geographic range of a desired location; and
        generating a power state alter signal responsive to the position signal satisfying the power altering rule, the power state alter signal configured to initiate altering the power state of the device from the reduced power state to the increased power state, the increased power state providing for one or more functionalities that are not provided when the device is operating at the reduced power state; and
    while the device is operating at the increased power state:
        providing a message pertaining to the desired location on the device responsive to the position signal satisfying the power altering rule.

2. The method of claim 1, comprising:
searching a calendar associated with a user of the device to determine the desired location.

3. The method of claim 1, the message describing an event associated with the desired location.

4. The method of claim 1, the device comprising a mobile device.

5. The method of claim 1, the device comprising a cellular telephone.

6. The method of claim 1, the message comprising at least one of a visual message or an audio message.

7. The method of claim 1, the desired location corresponding to a location of a second device.

8. The method of claim 7, comprising:
sending a second message from the device to the second device responsive to the position signal satisfying the power altering rule.

9. The method of claim 1, the generating a position signal comprising:
generating the position signal via a location signal receiver configured to receive power while the device is operating at the reduced power state.

10. The method of claim 9, the location signal receiver comprising at least one of a global navigation satellite system (GNSS) receiver or an advanced global positioning system (AGPS) receiver.

11. The method of claim 1, the generating a power state alter signal comprising:
computing an accuracy of a correlation between the power altering rule and the position signal; and
generating the power state alter signal when the accuracy of the correlation is above a specified threshold.

12. A system for altering a power state of a device, comprising:
    one or more processing units; and
    memory comprising instructions that when executed by at least some of the one or more processing units perform a method, comprising:
        while the device is operating at a reduced power state:
            generating a position signal indicative of a location of the device;
            comparing the position signal to a power altering rule providing for altering the power state of the device from a reduced power state to an increased power state, different than the reduced power state, when the device is within a specified geographic range of a desired location; and
            generating a power state alter signal responsive to the position signal satisfying the power altering rule, the power state alter signal configured to initiate altering the power state of the device from the reduced power state to the increased power state, the increased power state providing for one or more functionalities that are not provided when the device is operating at the reduced power state; and
        while the device is operating at the increased power state:
            providing a message pertaining to the desired location on the device responsive to the position signal satisfying the power altering rule.

13. The system of claim 12, the method comprising:
identifying the desired location from a calendar entry of a calendar associated with a user of the device.

14. The system of claim 12, the message comprising at least one of a visual message, an audio message, or a tactile message.

15. The system of claim 12, the device comprising a mobile device.

16. The system of claim 12, the generating a position signal comprising:
  generating the position signal via a location signal receiver configured to receive power while the device is operating at the reduced power state.

17. The system of claim 16, the location signal receiver comprising at least one of a global navigation satellite system (GNSS) receiver or an advanced global positioning system (AGPS) receiver.

18. The system of claim 12, the generating a power state alter signal comprising:
  computing an accuracy of a correlation between the power altering rule and the position signal; and
  generating the power state alter signal when the accuracy of the correlation is above a specified threshold.

19. The system of claim 12, the desired location corresponding to a location of a second mobile device.

20. A computer-readable memory not comprising a propagated data signal and comprising instructions that when executed perform a method for altering a power state of a device, the method comprising:
  while the device is operating at a reduced power state:
    generating a position signal indicative of a location of the device;
    comparing the position signal to a power altering rule providing for altering the power state of the device from a reduced power state to an increased power state, different than the reduced power state, when the device is within a specified geographic range of a desired location; and
    generating a power state alter signal responsive to the position signal satisfying the power altering rule, the power state alter signal configured to initiate altering the power state of the device from the reduced power state to the increased power state, the increased power state providing for one or more functionalities that are not provided when the device is operating at the reduced power state; and
  while the device is operating at the increased power state:
    providing a message pertaining to the desired location on the device responsive to the position signal satisfying the power altering rule.

* * * * *